US009288251B2

(12) United States Patent
Melnyk et al.

(10) Patent No.: US 9,288,251 B2
(45) Date of Patent: Mar. 15, 2016

(54) ADAPTIVE BITRATE MANAGEMENT ON PROGRESSIVE DOWNLOAD WITH INDEXED MEDIA FILES

(75) Inventors: Miguel Melnyk, Champaign, IL (US); Robert Kidd, Urbana, IL (US); Andrew Penner, Savoy, IL (US); Frederick Koopmans, Sunnyvale, CA (US); Jeremy Tidemann, Urbana, IL (US); Fabian Breg, Savoy, IL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 720 days.

(21) Appl. No.: 13/491,955

(22) Filed: Jun. 8, 2012

(65) Prior Publication Data
US 2012/0314761 A1 Dec. 13, 2012

Related U.S. Application Data

(60) Provisional application No. 61/495,952, filed on Jun. 10, 2011.

(51) Int. Cl.
*H04N 7/26* (2006.01)
*H04L 29/06* (2006.01)
(Continued)

(52) U.S. Cl.
CPC ............... *H04L 65/80* (2013.01); *H04L 65/605* (2013.01); *H04L 65/607* (2013.01);
(Continued)

(58) Field of Classification Search
CPC ......... H04N 7/26; H04N 7/173; H04N 11/04; G06F 15/173; G06F 15/16; H04L 65/605; H04L 29/06
USPC .............. 375/240.02; 709/241, 231; 370/389, 370/394
See application file for complete search history.

(56) References Cited

U.S. PATENT DOCUMENTS 6,740,802 B1 * 5/2004 Browne, Jr. ..................... 84/609
7,038,118 B1 * 5/2006 Gimarc .......................... 84/600
(Continued)

FOREIGN PATENT DOCUMENTS

EP      1 202 487      5/2002
EP      1 294 193      3/2003
(Continued)

OTHER PUBLICATIONS

"How to Encode for Adaptive Streaming" by Jan Ozer, Streaming Media West presentation on adaptive bitrate can turn casual encoders into instant experts, posted on Jan. 30, 2012 at URL; http://www.streamingmedia.com/Articles/Editorial/Featured-Articles/How-to-Encode-for-Adaptive-Streaming-80319.aspx.*
(Continued)

*Primary Examiner* — Dramos I Kalapodas
(74) *Attorney, Agent, or Firm* — Finnegan, Henderson, Farabow, Garrett & Dunner, LLP

(57) ABSTRACT

A method includes receiving streaming media data having an original media frame and an original frame index referencing the original media frame; determining an optimal session bitrate, wherein the optimal session bitrate is based on the available network bandwidth between a server and a terminal; allocating a frame budget for an output media frame by estimating a frame size of the output media frame based on the original frame index and the optimal session bitrate; generating the output media frame by processing the original media frame based on first encoding parameters and, if the allocated frame budget is greater than a frame size of the processed media frame, padding the processed media frame; and providing the output media frame.

20 Claims, 9 Drawing Sheets

(51) Int. Cl.

| | | |
|---|---|---|
| *H04N 21/2343* | (2011.01) | |
| *H04N 21/236* | (2011.01) | |
| *H04N 21/262* | (2011.01) | |
| *H04N 19/172* | (2014.01) | |
| *H04N 19/115* | (2014.01) | |
| *H04N 19/164* | (2014.01) | |
| *H04N 19/40* | (2014.01) | |
| *G06F 15/173* | (2006.01) | |

(52) U.S. Cl.
CPC .......... *H04N 19/115* (2014.11); *H04N 19/164* (2014.11); *H04N 19/172* (2014.11); *H04N 19/40* (2014.11); *H04N 21/23611* (2013.01); *H04N 21/234309* (2013.01); *H04N 21/26258* (2013.01)

(56) References Cited

U.S. PATENT DOCUMENTS

| | | | |
|---|---|---|---|
| 7,627,684 | B2 | 12/2009 | Boucher et al. |
| 7,643,422 | B1* | 1/2010 | Covell ............ H04N 21/234381 370/235 |
| 7,653,539 | B2 | 1/2010 | Yamanashi et al. |
| 7,720,983 | B2 | 5/2010 | Klemets et al. |
| 7,747,764 | B2 | 6/2010 | Batke et al. |
| 7,764,668 | B2 | 7/2010 | Yoshizawa et al. |
| 7,779,443 | B2 | 8/2010 | Kim |
| 8,173,883 | B2* | 5/2012 | Willacy et al. ................. 84/600 |
| 8,838,824 | B2* | 9/2014 | Jabri ........................ H04L 47/38 709/203 |
| 2002/0010938 | A1 | 1/2002 | Zhang et al. |
| 2002/0103554 | A1 | 8/2002 | Coles et al. |
| 2002/0154694 | A1 | 10/2002 | Birch |
| 2002/0181595 | A1 | 12/2002 | Obata et al. |
| 2003/0023738 | A1 | 1/2003 | Boivie et al. |
| 2003/0053454 | A1* | 3/2003 | Katsavounidis et al. ..... 370/389 |
| 2004/0107284 | A1 | 6/2004 | Koperda et al. |
| 2004/0141732 | A1 | 7/2004 | Sugiyama et al. |
| 2004/0170179 | A1 | 9/2004 | Johansson et al. |
| 2004/0267445 | A1 | 12/2004 | De Luca et al. |
| 2005/0005020 | A1 | 1/2005 | Rey et al. |
| 2005/0005025 | A1* | 1/2005 | Harville ............ H04L 29/06027 709/241 |
| 2005/0036698 | A1 | 2/2005 | Beom |
| 2005/0105471 | A1 | 5/2005 | Ido et al. |
| 2005/0132293 | A1* | 6/2005 | Herberger et al. ............ 715/723 |
| 2005/0155080 | A1* | 7/2005 | Zhang et al. ................... 725/126 |
| 2005/0175093 | A1 | 8/2005 | Haskell et al. |
| 2005/0180502 | A1 | 8/2005 | Puri |
| 2005/0210155 | A1 | 9/2005 | Oeda et al. |
| 2005/0259947 | A1 | 11/2005 | Wang et al. |
| 2005/0262251 | A1 | 11/2005 | Klemets et al. |
| 2005/0283809 | A1 | 12/2005 | Kim |
| 2006/0083260 | A1 | 4/2006 | Wang et al. |
| 2006/0092867 | A1 | 5/2006 | Muller et al. |
| 2006/0095943 | A1 | 5/2006 | Dermircin et al. |
| 2006/0122842 | A1* | 6/2006 | Herberger et al. ............ 704/278 |
| 2006/0156347 | A1 | 7/2006 | Zhang et al. |
| 2006/0165166 | A1 | 7/2006 | Chou et al. |
| 2006/0182027 | A1 | 8/2006 | Conte et al. |
| 2006/0184688 | A1 | 8/2006 | Ganguly et al. |
| 2006/0203831 | A1 | 9/2006 | Yoshizawa et al. |
| 2007/0091920 | A1 | 4/2007 | Harris et al. |
| 2007/0208557 | A1 | 9/2007 | Li et al. |
| 2008/0120424 | A1 | 5/2008 | Deshpande |
| 2008/0190268 | A1* | 8/2008 | McNally ........................ 84/609 |
| 2008/0195743 | A1 | 8/2008 | Brueck et al. |
| 2008/0195744 | A1* | 8/2008 | Bowra .................... H04L 65/80 709/231 |
| 2008/0198929 | A1 | 8/2008 | Fujihara |
| 2008/0294446 | A1* | 11/2008 | Guo et al. ...................... 704/501 |
| 2009/0013366 | A1 | 1/2009 | You et al. |
| 2009/0019178 | A1 | 1/2009 | Melnyk et al. |
| 2009/0043410 | A1* | 2/2009 | Evans et al. ...................... 700/94 |
| 2009/0106356 | A1 | 4/2009 | Brase et al. |
| 2009/0232220 | A1 | 9/2009 | Neff et al. |
| 2009/0254657 | A1 | 10/2009 | Melnyk et al. |
| 2009/0327698 | A1 | 12/2009 | Baker et al. |
| 2010/0064882 | A1* | 3/2010 | Miyajima et al. ................ 84/625 |
| 2010/0074535 | A1 | 3/2010 | Bennett |
| 2010/0205318 | A1 | 8/2010 | Melnyk et al. |
| 2010/0235542 | A1* | 9/2010 | Visharam ................ G06F 15/16 709/246 |
| 2011/0066703 | A1* | 3/2011 | Kaplan et al. .................. 709/219 |
| 2011/0082945 | A1 | 4/2011 | Myers |
| 2011/0093900 | A1 | 4/2011 | Patel |
| 2012/0023251 | A1* | 1/2012 | Pyle ............... H04N 21/234327 709/231 |
| 2012/0170642 | A1* | 7/2012 | Braness ............... G11B 27/005 375/240.01 |
| 2012/0254456 | A1* | 10/2012 | Visharam ........... H04N 21/2343 709/231 |
| 2013/0166625 | A1* | 6/2013 | Swaminathan .. H04N 21/64738 709/203 |
| 2014/0328397 | A1* | 11/2014 | Jeon ....................... H04N 19/61 375/240.12 |
| 2014/0329794 | A1* | 11/2014 | Duncan ................ C07D 217/12 514/210.18 |

FOREIGN PATENT DOCUMENTS

| | | |
|---|---|---|
| WO | WO 2005/022845 | 3/2005 |
| WO | WO 2007/018841 | 2/2007 |
| WO | WO 2008/098249 | 8/2008 |
| WO | 2011046618 | 4/2011 |

OTHER PUBLICATIONS

"What is HLS (HTTP Live Streaming)?" by Jan Ozer, Fig. 1, sub. Producing HLS at the link: http://www.streamingmedia.com/Articles/Editorial/What-is-.../What-is-HLS-(HTTP-Live-Streaming)-78221.aspx.*

"What is Adaptive Streaming?" by Jan Ozer,Posted on Apr. 28, 2011 at URL: http://www.streamingmedia.com/Articles/Editorial/What-is-.../What-is-Adaptive-Streaming-75195.aspx.*

"Performance Issues of a Distributed Frame Buffer on a Multicomputer" by Stephen. Spencer et al., Princeton University 1998, DOI=10.1145/285305.285316, published at URL: http://citeseerx.ist.psu.edu/viewdoc/download?doi=10.1.1.130.6841&rep=rep1&type=pdf.*

Baldo, Nicola, et al., "RTCP Feedback Based Transmission Rate Control for 3G Wireless Multimedia Streaming," IEEE, 0-7803-8523-3/04 (2004), pp. 1817-1821.

Basso, Andrea, et al., "Performance Evaluation of MPEG-4 Video over Realistic EDGE Wireless Networks," IEEE, 0-7803-7442-8/02 (2002), pp. 1118-1122.

Qu, Qi, et al., "Network-Aware Source-Adaptive Video Coding for Wireless Applications," 0-7803-8847-X/04 MILCOM (2004), Military Communications Conference, pp. 848-854.

Schulzrinne, H. et al., "RTP: A Transport Protocol for Real-Time Applications," Network Working Group, Jul. 2003, pp. 1-103.

International Search Report and Written Opinion mailed Oct. 10, 2008 for International Appl. No. PCT/US2008/008556.

International Search Report and Written Opinion mailed Apr. 7, 2010 for International Appl. No. PCT/US2010/000302.

Office Action mailed on Mar. 18, 2010 in related U.S. Appl. No. 12/170,347, filed Jul. 9, 2008.

Office Action mailed on Sep. 1, 2010 in related U.S. Appl. No. 12/170,347, filed Jul. 9, 2008.

Office Action mailed Sep. 24, 2010 in related U.S. Appl. No. 12/416,085, filed Mar. 31, 2009.

International Search Report and Written Opinion mailed Sep. 13, 2010 for International Appl. No. PCT/US2010/000959.

Notice of Allowance and Examiner Interview Summary mailed on Mar. 25, 2011 in related U.S. Appl. No. 12/170,347, filed Jul. 9, 2008.

Notice of Alowance and Examiner Interview Summary mailed on Mar. 29, 2011 in related U.S. Appl. No. 12/416,085, filed Mar. 31, 2009.

(56) References Cited

OTHER PUBLICATIONS

Melnyk, M. et al. "Adaptive Bitrate Management for Streaming Media Over Packet Networks"; U.S. Appl. No. 12/416,085, filed Mar. 31, 2008; pp. 1-46.
Office Action mailed May 12, 2011 in related U.S. Appl. No. 12/368,260, filed Feb. 9, 2009.
Melnyk, M. et al. "Method for Controlling Download Rate of Real-Time Streaming as Needed by Media Player," U.S. Appl. No. 12/368,260, filed Feb. 9, 2009; pp. 1-44.
International Preliminary Report on Patentability and Written Opinion for PCT Application No. PCT/US2010/000959 issued Oct. 4, 2011.
Office Action mailed Oct. 25, 2011 in related U.S. Appl. No. 13/190,238, filed Jul. 25, 2011.
Office Action mailed Nov. 23, 2011 in related U.S. Appl. No. 13/194,761, filed Jul. 29, 2011.
Office Action dated Aug. 4, 2011 in related European Application No. 08780143.7 filed Jan. 28, 2010.
Final Office Action dated Nov. 17, 2011, in related U.S. Appl. No. 12/368,260, filed Feb. 9, 2009.
Office Action dated Apr. 4, 2012, in related European Application No. 08780143.7, filed Jan. 28, 2010.
Notice of Allowance mailed Apr. 25, 2012 for U.S. Appl. No. 13/194,761.
Notice of Allowance mailed Mar. 29, 2012 for U.S. Appl. No. 13/190,238.
International Search Report and Written Opinion for International Application No. PCT/US2010/002762 mailed May 19, 2011.
International Preliminary Report on Patentability for International Application No. PCT/US2010/002762 mailed Apr. 26, 2012.
PCT Notification of Transmittal of the International Search Report and the Written Opinion of the International Searching Authority for PCT/US2012/041684 mailed Jan. 22, 2013, 17 pages.

* cited by examiner

ADAPTIVE BITRATE MANAGEMENT ON PROGRESSIVE DOWNLOAD WITH INDEXED MEDIA FILES

CROSS REFERENCE TO RELATED PATENTS

This application claims the benefit of U.S. Provisional Application No. 61/495,952, "Adaptive Bitrate Management on Progressive Download with Indexed Media Files," filed Jun. 10, 2011, herein incorporated by reference.

BACKGROUND INFORMATION

Rate control is essential for media streaming over packet networks. The challenge in delivering bandwidth-intensive content-like multimedia over capacity-limited, shared links is to quickly respond to changes in network conditions by adjusting the bitrate and the media encoding scheme to optimize the viewing and listening experience of the user. In particular, when transferring a fixed bitrate over a connection that cannot provide the necessary throughput, several undesirable effects arise. For example, a network buffer may overflow resulting in packet loss causing garbled video or audio playback, or a media player buffer may underflow resulting in playback stall.

HTTP progressive download, or pseudo-streaming is perhaps the most widely used technique for media transport over the internet. This method consists of the HTTP download of a media file, which is played back by the Media Player as data becomes available.

Media files can be categorized in two different types: (1) streamable without index; and (2) streamable with index. Streamable without index is where provided information for playing a media frame is fully contained within the media frame in the sense that a master index of frames is not needed by the player to render, or seek to a frame, while streamable with index is where individual media frames cannot be played, or seeked without a file index. The file index is associated with a number of data frames containing content. The file index lets the media player know in what order to process each of the associated data frames. For streamable with index media files (hereinafter referred to as "indexed media files"), the media player must process the file index first so that the media player is able to correctly play the indexed media file. An example of an indexed media file is MP4 (known as "MPEG-4 Part 14", or "ISO/IEC 14496-14:2003"). MP4 is a multimedia container file format standard specified as a part of MPEG-4.

Generating an indexed media file is usually a two-step process. In the first step, an encoder may generate data frames and record their sizes in a separate table. After all frames have been encoded, the encoder may then write the file index. In the second step, the encoder may arrange the file index and generated data frames in a correct order for streaming. One of the problems with this traditional two step MP4 encoding process is that it cannot provide a real-time transcoding, compression, optimization, or any other real-time, on-the-fly modification process.

DETAILED DESCRIPTION OF DRAWINGS

Reference will now be made in detail to the exemplary embodiments, the examples of which are illustrated in the accompanying drawings. Wherever possible, the same reference numbers will be used throughout the drawings to refer to the same or like parts.

Some exemplary embodiments disclosed herein are directed to methods and systems for dynamic budget encoding. Dynamic budget encoding is a technique performed by an adaptive bitrate manager to generate and output indexed data in a media container format, having an output frame index specifying a byte size and a byte offset for each output media frame, within a real-time processing model. The adaptive bitrate manager actively monitors available network bandwidth between the adaptive bitrate manager and a terminal. The adaptive bitrate manager is then able to dynamically adjust encoding parameters of the indexed data within changing network conditions. The real-time budget encoding technique may allow for intercepting one or more downloads from a media server, processing its media content, and generating output indexed data that can be streamed to a terminal.

In some embodiments, the adaptive bitrate manager can transcode the original indexed media file into a fragmented indexed file format. In the fragmented indexed file format, the original file index and the original media frames are transcoded into a series of indexed file fragments. The adaptive bitrate manager encodes each of the indexed file fragments according to the available network bandwidth between the adaptive bitrate manager and a terminal.

In some embodiments, the adaptive bitrate manager may be configured to transcode the original indexed media file into a format that operates using a streaming protocol. For example, the adaptive bitrate manager may transcode an .MP4 clip into APPLE™ HTTP Live Streaming format.

In some embodiments, adaptive bitrate manager may be configured to transcode the original indexed media file into an unindexed media file, and then pseudo-stream the transcoded data to a terminal. For example, adaptive bitrate manager may transcode an .MP4 clip into a flash video format ("FLV") and pseudo-stream the transcoded data to the terminal.

Adaptive bitrate management can be applied to all media transports (or protocol suites) that can be used for media transfer and provide transmission progress report mechanisms. The transmission progress report can apply to a multimedia session as a whole, or individual multimedia streams (audio, video, text, etc). The adaptive bitrate manager can include the ability to provide, to the sender, a way to map media time information to the bytes received by the receiver, either explicitly as in the case of RTCP, or implicitly, as in the TCP case through ACK packets.

Figure 1:
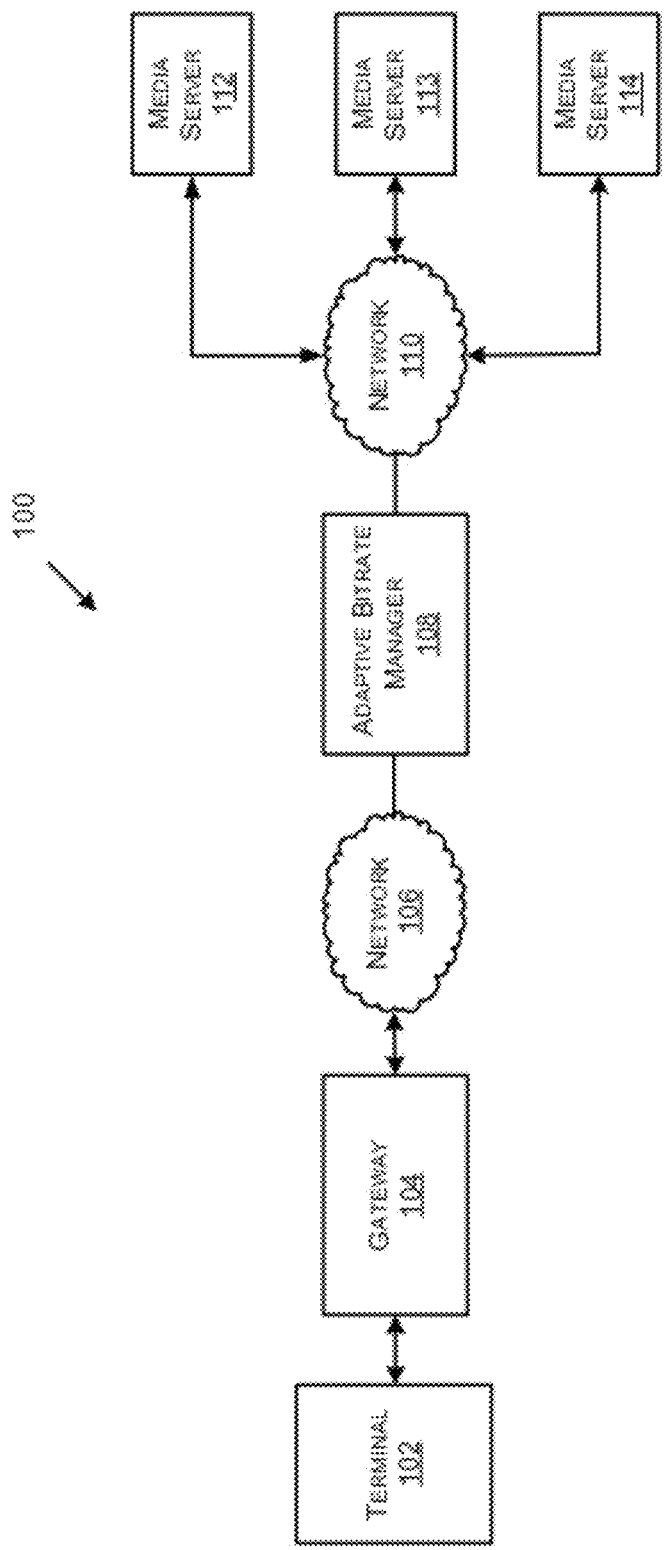
FIG. 1 is a block diagram of an exemplary system.

FIG. 1 is a block diagram of an exemplary system. Exemplary system 100 can be any type of system that transmits data packets over a network. For example, the exemplary system can include a mobile terminal accessing streaming media data from media servers through the Internet. The exemplary system can include, among other things, a terminal 102, a gateway 104, one or more networks 106 and 110, an adaptive bitrate manager 108, and one or more media servers 112-114.

Terminal 102 is a hardware component including software applications that allow terminal 102 to communicate and receive packets corresponding to streaming media. Terminal 102 provides a display and one or more software applications, such as a media player, for displaying streaming media to a user of terminal 102. Further, terminal 102 has the capability of requesting and receiving data packets, such as data packets of streaming media, from the Internet. For example, terminal 102 can send request data to media servers 112-114; for a particular file or object data of a web page by its URL, and the media server of the web page can query the object data in a database and send the corresponding response data to terminal 102. In some embodiments, response data may be routed through adaptive bitrate manager 108.

While terminal 102 can be a wired terminal, some embodiments may prefer using a mobile terminal because mobile terminals are more likely to be in networks that would benefit more from adaptive bitrate manager 108. The network connection tends to be less stable as compared to wired network connection due to, for example, the changing position of the mobile terminal where data rate transmissions between the mobile terminal and the network can fluctuate, in some cases quite dramatically.

Gateway 104 is one or more devices that serve as an entrance or a means of access and may or may not convert formatted data provided in one type of network to a particular format required for another type of network. Gateway 104, for example, may be a server, a router, a firewall server, a host, or a video optimizer. For example, gateway 104 may have the ability to transform signals received from user device 102 into signals that network 106 or 110 can understand and vice versa. This transforming ability, however, is not required in some data network, for example, Fourth-Generation (4G) or Worldwide Interoperability for Microwave Access (WiMAX). Gateway 104 may be capable of processing audio, video, and T.120 transmissions alone or in any combination, and is capable of full duplex media translations. Further, gateway 104 can include an adaptive bitrate manager 108.

Networks 106 and 110 can include any combination of wide area networks ("WANs"), local area networks ("LANs"), or wireless networks suitable for packet-type communications, such as Internet communications. Further, networks 106 and 110 can include buffers for storing packets prior to transmitting them to their intended destination.

Adaptive bitrate manager 108 is a server that provides communications between terminal 102 and media servers 112-114. Adaptive bitrate manager 108 can optimize performance by adjusting a streaming media bitrate according to the connection, i.e., media network, between adaptive bitrate manager 108 and terminal 102. Adaptive bitrate manager 108 may include one or more processors, a memory, a data interface, a display, or some combination thereof. The processor(s) can be a single or multiple microprocessors, field programmable gate arrays (FPGAs), or digital signal processors (DSPs) capable of executing particular sets of instructions. Some of the methods performed by adaptive bitrate manager 108 may be implanted using computer-readable instructions that can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, some of the methods can be implemented in hardware components or combinations of hardware and software such as, for example, ASICs, special purpose computers, or general purpose computers.

Adaptive bitrate manager 108 is configured to determine the available network bandwidth between adaptive bitrate manager 108 and terminal 102. And to determine an optimal session bitrate based on the available network bandwidth. Adaptive bitrate manager 108 is configured to apply dynamic budget encoding techniques to an original indexed media file 230.

In dynamic budget encoding techniques, an original indexed media file (e.g., .MP4 file) is broken up into its respective original file index and associated original media frames. Adaptive bitrate manager 108 is configured to create an output file index in accordance with a frame budget and the optimal session bitrate. Adaptive bitrate manager 108 is configured to stream the output file index to terminal 102 once it has been created. Additionally, adaptive bitrate manager 108 is configured to determine a frame budget using the optimal session bitrate and dynamically encode each of the original media frames in accordance with the allocated frame budget and the optimal session bitrate according to adaptive bitrate manager 108. Accordingly, adaptive bitrate manager 108 is able to adjust the level of compression for each media frame based on the available network bandwidth. To encode the original media frames, adaptive bitrate manager 108 is configured to use parameters of the original media frame and the corresponding frame budget to predict processing parameters, such as encoding parameters, including one or more quantization parameters, to be used for processing (e.g., encoding) the frame.

Adaptive bitrate manager 108 is configured to pad each of the encoded media frames in accordance with the frame budget. Thus, the original indexed media file may be coded to a lower bitrate without substantially changing the media formats. Adaptive bitrate manager 108 is configured to perform lossless compression on the padded media frames prior to streaming them to terminal 102.

Moreover, after an output file index has been created, adaptive bitrate manager 108 is configured to perform on-the-fly adjustments to the encoding of the original media frames based on the available network bandwidth between adaptive bitrate manager 108 and terminal 102. For example, adaptive bitrate manager 108 may vary the compression used during the processing such that media may be transmitted over a lower bandwidth channel. Likewise, adaptive bitrate manager 108 may vary the compression used during the processing such that media may be transmitted over a higher bandwidth channel. Adaptive bitrate manager 108 may also be used to transcode video content, add watermarks, logos, or other similar video processing on-the-fly, as original video content is downloaded from the server. As an alternative to the configuration of system 100 shown in FIG. 1, the processing performed by adaptive bitrate manager 108 can be performed by any of the media servers 112-114, or any network device between terminal 102 and media servers 112-114.

In some embodiments, adaptive bitrate manager 108 is configured to transcode original indexed media files using a fragmented indexed file format. In a fragmented indexed file format, the original file index and the original media frames are transcoded into a series of indexed file fragments, where each indexed file fragment has the same file structure, e.g., a fragment file index and one or more fragment media frames. The indexed file fragments may be the same format as the original indexed media file, or they may be some other indexed file format. The complete media file is displayed by playing each indexed file fragment in sequence. It is not necessary for the media player associated with terminal 102 to construct an index using all of the file fragment indices for the complete media file before starting playback. To display a given indexed file fragment, the media player only uses the indexed file fragment and the preceding indexed file fragment. Because each indexed file fragment has a fragment file index describing the media in that fragment, once the fragment file index has been sent to terminal 102, the bitrate for that indexed file fragment is fixed. As the indexed file fragment describes only a short portion of the original indexed media file, adaptive bitrate manager 108 is free to choose different encoding parameters for each indexed file fragment as network conditions change. Additionally, adaptive bitrate manager 108 may be configured to apply dynamic budget encoding techniques to individual indexed file fragments and the fragment media frames contained therein. Alternatively, adaptive bitrate manager 108 may be configured to generate each indexed file fragment using a standard encoding method and send the file fragment index and encoded media to the media player without using any dynamic budget encoding techniques.

In some embodiments, adaptive bitrate manager 108 may be configured to transcode the original indexed media file into a format that operates using a streaming protocol, and then stream the transcoded data to terminal 102. For example, adaptive bitrate manager may transcode an .MP4 clip into APPLE™ HTTP Live Streaming format, and stream the transcoded data to terminal 102. Additionally, adaptive bitrate manager 108 is configured to manage the bitrate of the Live Streaming on-the-fly, to match instantaneous network conditions.

In some embodiments, adaptive bitrate manager 108 may be configured to transcode the original indexed media file into an unindexed media file, and then pseudo-stream the transcoded data to terminal 102. For example, adaptive bitrate manager may transcode an .MP4 clip into a flash video format ("FLV") and pseudo-stream the transcoded data to terminal 102. Additionally, adaptive bitrate manager 108 is configured to manage the bitrate of the FLV pseudo-streaming on-the-fly, to match instantaneous network conditions.

Media servers 112-114 can be computer servers that receive a request for media content from terminal 102, process the request, and provide media content to terminal 102 through, in some embodiments, adaptive bitrate manager 108. For example, media servers 112-114 can be web servers, enterprise servers, or any other type of computer servers. Media servers 112-114 can be computers programmed to accept requests (e.g., HTTP or other non-streamable protocols) from terminal 102 and to serve terminal 102 with video stream. Also, media servers 112-114 can be PDAs, cell phones, laptops, desktops, or any devices configured to transfer media content to terminal 102 through, in some embodiments, one or more networks 106 and 110. In addition, media servers 112-114 can be broadcasting facilities, such as free-to-air, cable, satellite, and other broadcasting facilities, for distributing media content to terminal 102 through, in some embodiments, adaptive bitrate manager 108. Further, media servers 112-114 can be video sources, such as surveillance devices configured to capture videos and transfer the captured videos to terminal 102 through, in some embodiments, adaptive bitrate manager 108. Also, as an alternative to the configuration of system 100 shown in FIG. 1, any of media servers 112-114 can include adaptive bitrate manager 108 for quality-aware video optimization.

Figure 2:
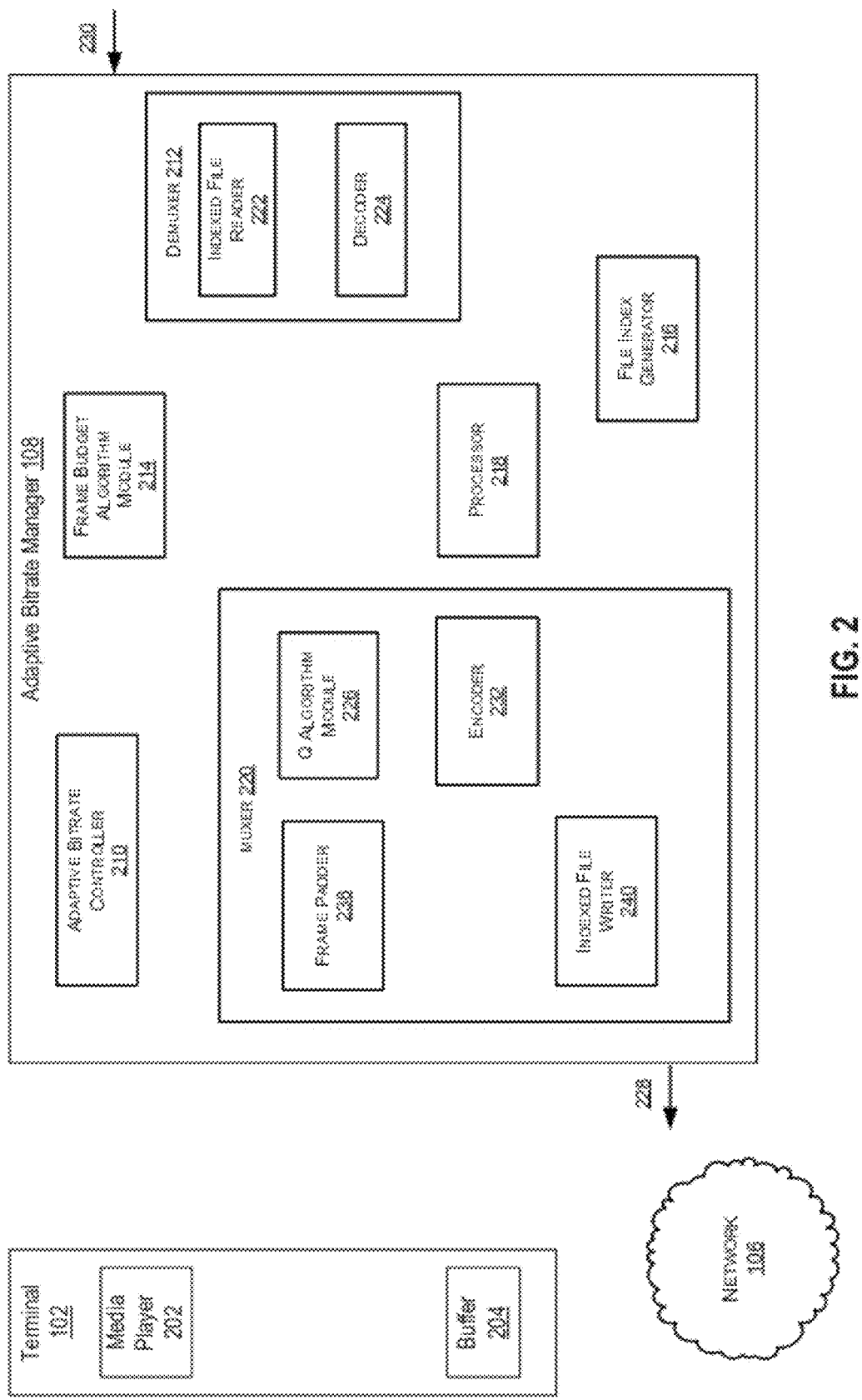
FIG. 2 is a block diagram illustrating an embodiment of the exemplary system of FIG. 1.

FIG. 2 is a block diagram illustrating an embodiment of the exemplary system of FIG. 1. Terminal 102 may include, among other things, a media player 202 and a buffer 204. Adaptive bitrate manager 108 can include, among other things, an adaptive bitrate controller 210, a demuxer 212, a frame budget algorithm module 214, a file index generator 216, a processor 218, and a muxer 220. The illustrated configuration of adaptive bitrate manager 108 is exemplary only, and can be modified to provide discrete elements or combine multiple elements into a single one, and be provided as any combination of hardware and software.

Media player 202 is computer software for playing multimedia files (such as streaming media) including video and/or audio media files. Such popular examples of media player 202 can include Microsoft Windows Media Player, Apple Quicktime Player, RealOne Player, and Adobe Flash Plugin for web-embedded video. In some embodiments, media player 202 decompresses the streaming video or audio using a codec and plays it back on a display of terminal 102. Media player 202 can be used as a standalone application or embedded in a web page to create a video application interacting with HTML content. Further, media player 202 can provide feedback on media reception to adaptive bitrate manager 108 in the form of media receiver reports. Media receiver reports can include, for example, RTCP packets for an RTP streaming session, or TCP ACKs for a pseudo-streaming session.

Buffer 204 (also known as terminal buffer 204) is a software program and/or a hardware device that temporarily stores multimedia packets before providing the multimedia packets to media player 202. In some embodiments, buffer 204 receives the multimedia packets from adaptive bitrate manager 108 via network 106. In some embodiments, buffer 204 receives the multimedia packets from a device other than adaptive bitrate manager 108. Once buffer 204 receives multimedia packets (or portions of a media clip if pseudo-streaming), it can provide the stored multimedia packets to media player 202. While FIG. 2 illustrates that terminal buffer 204 and media player 202 are separate components, one of ordinary skill the art will appreciate that terminal buffer 204 can be a part of media player 202. Further, while FIG. 2 illustrates only a single buffer, one of ordinary skill in the art will appreciate that multiple buffers can exist, for example, one or more buffers for audio media packets and one or more buffers for video media packets.

Demuxer 212 can include an indexed file reader 222 and a decoder 224. Indexed file reader 222 can be a software program and/or a hardware device that can receive an original indexed media file and extract from the original indexed media file a frame index specifying a frame/byte size, a byte offset, and order of each original media frame in the original indexed media file. Further, indexed file reader 222 may retrieve original media frames from the original indexed media file and provide one or more of the original media frames to a decoder 224, frame budget algorithm module 214, or some combination thereof, for further processing. For example, if the indexed media file is an MP4 file, the file index would include an original moov box, specifying a frame/byte size, a byte offset, and order of each original media frame in an original mdat box of the original MP4 file. And indexed file reader 222 would be configured to retrieve original media frames from an original mdat box of the MP4 file for further processing.

Decoder 224 can be provided as a software program and/or a hardware device to decode each received media frame, obtain original encoding parameters, and annotate the original encoding parameters onto the decoded frame. The original encoding parameters include, but are not limited to, one or more original quantization parameters for quantizing (lossy-compressing) the retrieved media frame, original configuration information of an encoder, one or more original compression algorithms and parameters, and other original encoding information used for creating the received media frame. Decoder 224 may supply the original encoding parameters to quantization algorithm module 226 to predict new encoding parameters, including new quantization parameters, for generating an encoded frame within a frame budget. Decoder 224 may support commonly used audio/video encoding/decoding standards, for example, H.264 and/or MPEG4 codecs.

Frame budget algorithm module 214 can be provided as a software program and/or a hardware device to calculate byte size for each output frame in the output indexed data (228) based on the original file index and the optimal session bitrate. Output indexed data 228 includes output file indices and their associated output media frames. The calculated byte size can be used as a frame budget for an output media frame such that a corresponding original media frame can be compressed to fit within the frame budget. Each output media frame has a corresponding frame budget. In some embodiments, the frame budget for each output media frame is in excess of the original media frame size. For example, frame budget algorithm module 214 can be configured to provide a frame budget of 150% of the original media frame size. The primary input to frame budget algorithm module 214 can be the original file index from the original indexed media file 230. Frame budget algorithm module 214 may also consider some parameters determined by decoder 224 and/or encoder 232. These parameters may be determined during an initial probe of the input file, and may be available for a sample of the frames in the input.

Frame budget algorithm module 214 may consider whether the output indexed data is sent to terminal 102 using an additional lossless compression technique, for example, gzip content encoding or other compression techniques. Some or most padding added to an output frame may be eliminated through the additional compression technique. Thus, frame budget algorithm module 214 may increase the frame budgets to reduce the chance that any frame may need to be encoded more than once to fit within a corresponding frame budget. More bytes may be wasted in each frame, but the compression may eliminate these extra bytes, so they may not be transmitted over the network.

File index generator 216 can be provided as a software program and/or a hardware device that combines the frame budgets determined by frame budget algorithm module 214 with the original file index extracted from original indexed media file 230 to generate an output/processed file index for the output indexed data 228. File index generator 216 may also consider the configuration of encoder 232 to update certain fields in the output file index.

In some embodiments, adaptive bitrate manager 108 is configured to use a fragmented indexed file format. In a fragmented indexed file format the original file index and the original media frames are encoded as a series of indexed file fragments. For example, instead of having a single output file index, file index generator 216 creates a plurality of fragment file indices, and each fragment file index is associated with a respective portion of fragment media frames such that the complete media file is displayed by playing each fragment in sequence. In this embodiment, file index generator 216 combines the frame budgets determined by frame budget algorithm module 214 with portions of the original file index to generate a first fragmented file index. File index generator 216 may also consider the configuration of encoder 232 to update certain fields in the fragmented file indices.

Adaptive bitrate manager 108 is configured to generate and send a first indexed file fragment to terminal 102. As the adaptive bitrate manager receives feedback from terminal 102, it determines and adjusts what it perceives to be an optimal session bitrate needed to maintain smooth playback given the available network bandwidth. After the first indexed file fragment has been sent to terminal 102, a second indexed file fragment is generated based on the optimal session bitrate and sent to terminal 102. The encoding parameters may vary between indexed file fragments. Additional, indexed file fragments are generated based on whatever the current optimal session bitrate is perceived to be by adaptive bitrate manager 108, and sent to terminal 102 until all of content associated with the original media frames has been transmitted to terminal 102. In some embodiments the encoding parameters may vary between fragment media frames.

Processor 218 can be provided as a software program and/or a hardware device that functions as a placeholder for the media data being processed. Processor 218 may also perform additional modifications to the media data, for example, such as adding a watermark to the media data.

Muxer 220 can include a quantization algorithm module 226, encoder 232, a frame padder 238, and an indexed file writer 240. The illustrated configuration of muxer 220 is exemplary only, and can be modified to provide discrete elements or combine multiple elements into a single one, and be provided as any combination of hardware and software.

Quantization algorithm module 226 can be provided as a software program and/or a hardware device that determines new encoding parameters based on the frame budgets decided by frame budget algorithm module 214, the encoding parameters annotated by decoder 224 for decoded media frames, and the optimal session bitrate provided by adaptive bitrate controller 210. The new encoding parameters may include, but are not limited to, one or more quantization parameters for quantizing the retrieved media frame, configuration information of encoder 232, compression algorithms and parameters, and other new encoding information for encoding the decoded media frames.

After frame budget algorithm module 214 has determined a frame budget for an output frame, encoder 232 may reliably encode each original media frame to most closely meet the frame budget without exceeding the allotted bytes. Many methods may be used to achieve byte reduction in media processing. In the exemplary embodiments discussed herein, one or more encoding parameters, including quantization parameters, may be used to control byte reduction on a frame-by-frame basis.

Quantization (Q) algorithm module 226 may produce one or more new quantization parameters that may result in an encoded frame below a corresponding frame budget. Encoder 232 may then encode the frame with the one or more new quantization parameters. If the resulting frame does not meet the budget, quantization algorithm module 226 can further adjust the one or more new quantization parameters and re-encode until the frame fits within the allocated budget. Once the frame is within the allocated budget, it may be padded to match frame budget.

Quantization algorithm module 226 may also consider types of media frames to generate the quantization parameters, for example, such as intra-frames (I-frame) or predicted-frames (P-frames). The I-frame, is a media frame that stores a complete image. Each I-frame may have one or more associated P-frames. The P-frames store changes that occur from one frame to the next, beginning with the I-frame, thus, greatly reducing the amount of information that is stored. Because I-frames hold a complete image, they generally are less compressible than P-frames. Although an original file index may not explicitly designate which frames are I-frames or P-frames, it may be possible to estimate a group of picture ("GOP") size (number of frames between I-frames) since I-frames are typically larger than P-frames. For frames with a fixed GOP size, this may lead to periodicity in the original file index. This GOP induced periodicity may be measured using techniques described in detail in related U.S. Patent Publication Application 2011/0090953, filed on Oct. 15, 2009. This calculation is a refinement used to obtain better performance (i.e. less padding). Knowing this GOP size in advance may aid in selecting the output encoding parameters, e.g., GOP, to match encoding parameters of an input media frame.

Encoder 232 can be provided as a software program and/or a hardware device that encodes each decoded media frame to meet a corresponding frame budget without exceeding the allotted bytes. Encoder 232 is configured to take two inputs, i.e., an output of frame budget algorithm module 214 and an output of quantization algorithm module 226. If encoding parameters predicted by quantization algorithm module 226 do not produce a frame that fits within a corresponding frame budget, encoder 232 may invoke quantization algorithm module 226 to adjust the parameters, then re-encode the frame. A feedback loop may exist between encoder 232 and quantization algorithm module 226 to refine encoding parameters when encoder 232 exceeds a frame budget and has to re-encode a frame. Refining encoding parameters is discussed in detail in related U.S. Patent Publication Application 2011/0090953, filed on Oct. 15, 2009, herein incorporated by reference. Additionally, in some embodiments, encoder 232 may be configured to transcode the original indexed media file 230 into a format that operates using a streaming protocol.

Figures 3A, 3B:
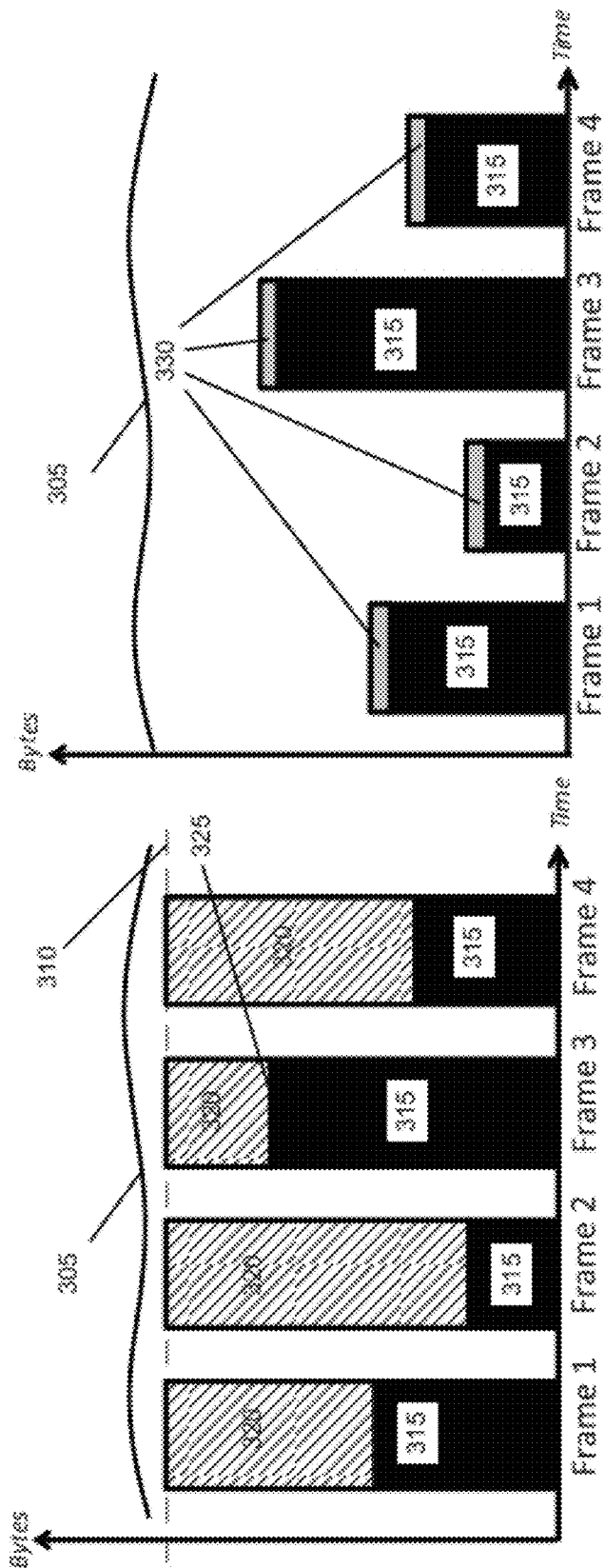
FIG. 3A illustrates four example output media frames prior to lossless compression.
FIG. 3B illustrates the four media frames depicted in FIG. 3A after lossless compression has occurred.

Frame padder 238 can be provided as a software program and/or a hardware device that inserts padding bytes to make an encoded frame match a corresponding frame budget. FIG. 3A illustrates four example output media frames prior to lossless compression. Each of the frames has the same frame budget (310), and each of the output media frames have undergone some amount of compression depending in part on the frame budget and the optimal session bitrate. As discussed above, the optimal session bitrate is based on available network bandwidth 305 between an adaptive bitrate manager and a terminal. The filled portion of each output media frame represents the encoded portion (315) of the output media frame, and the hashed area of each frame represents padding 320 added to the encoded portion 315 so that the total frame size equals frame budget 310. Referring back to FIG. 2, the padding bytes may ultimately be fed to a decoder on terminal 102, and these padding bytes are a no-operation indication to the decoder.

Indexed file writer 240 can be provided as a software program and/or a hardware device to generate output indexed file data 228. Output indexed file data 228 may include the output file index, output media frames, or a combination thereof. Indexed file writer 240 writes the output file index as output indexed file data 228, which is then streamed to terminal 102. Indexed file writer 240 may perform lossless compression on the padded media frames to create output media frames.

Indexed file writer 240 is configured to write the output media frames as output indexed file data 228 which is then streamed to terminal 102. The padding sequence inserted by frame padder 238 is highly redundant, so the padded-compressed frames may be further be compressed by a lossless compression method. This may reduce the total number of bytes sent across the network with little additional processing overhead. With an appropriate compression method, the padding bytes may be virtually eliminated from the padded compressed frames. The resulting output indexed file data 228 is then transmitted across data network 106.

In some embodiments, if it is known that a compression technique will be used on the padded-compressed frames, frame budget algorithm module 214 may pick a frame size, a frame budget, large enough so that encoder 232 may rarely have to re-encode a frame. Resulting uncompressed indexed media frames may actually be larger than the corresponding original media frames. Compression may eliminate all padding, so the number of bytes transmitted across the network may be almost the same as number of bytes actually used for the encoded frames. For example, FIG. 3B illustrates the four media frames depicted in FIG. 3A after lossless compression has occurred. The gray areas of each frame correspond to padding 320 that has been subjected to a lossless compression algorithm to create compressed padding 330, thus reducing the bandwidth needed to transmit each output media frame. The output media frame may then be transmitted to terminal 102.

Figures 3C, 3D:
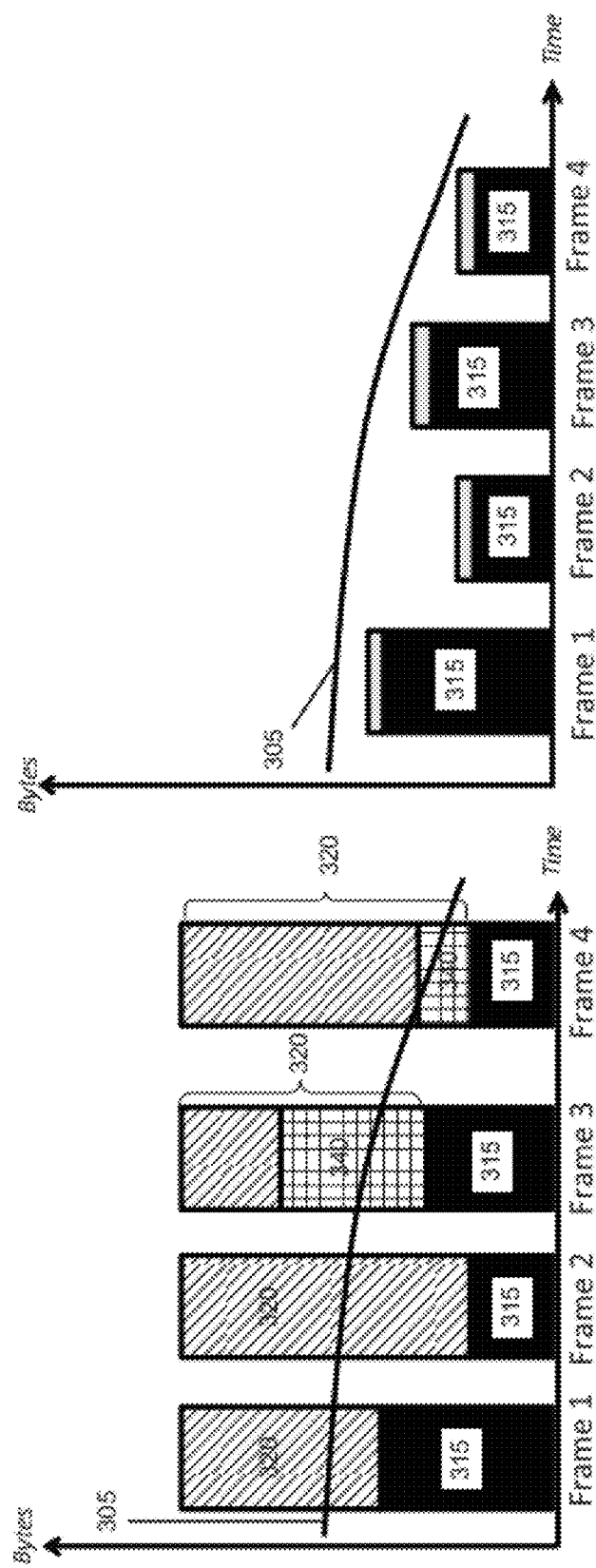
FIG. 3C illustrates four example output media frames prior to lossless compression and subject to degrading network conditions.
FIG. 3D illustrates the four media frames depicted in FIG. 3C after lossless compression has occurred.

Referring back to FIG. 2, adaptive bitrate controller 210 is a software program and/or hardware device that periodically receives media receiver reports, e.g., such as RTCP receiver reports or TCP ACKs, from terminal 102. Adaptive bitrate manager 108 is configured to monitor the available bandwidth and dynamically adjust the optimal bitrate as each original media frame is processed. Adaptive bitrate controller 210 is configured to calculate an optimal session bitrate to be used during the next period for encoding multimedia data to be sent to terminal 102. To compute the optimal session bitrate, adaptive bitrate controller 210 uses one or more network state estimators for estimating the available bandwidth of network 106 and computing the optimal session bitrate. For example, these network state estimators are calculated using the received receiver reports and can estimate a media time in transit (MTT), a bitrate received at terminal 102, a round trip time estimate (RTTE), and a packet loss count. Adaptive bitrate controller 210 is configured to provide the optimal session bitrate to a frame budget algorithm module 214 and a quantization algorithm module 226. As discussed above, these modules use the optimal session bitrate information to create the output file index and dynamically encode the original media frames. For example, FIG. 3C illustrates four example output media frames prior to lossless compression and subject to degrading network conditions. Adaptive bitrate manager 108 processes the first frame using an initial compression level, such that original media frame is reduced in size to a compressed portion 315. The network conditions continue to degrade, however, the first compression level is still sufficient to process and send frame 2 without increasing the amount of compression. But, available network bandwidth 305 is not sufficient to effectively transmit frames 3 and 4 without increasing the level of compression. If the initial level of compression were to be used on frames 3 and 4, the compressed portions of frames 3 and 4 would include regions 340, and the combination of compressed portions 315 and regions 340 would exceed available network bandwidth 305. Accordingly, adaptive bitrate controller 210 dynamically reduces the optimal session bitrate such that the encoder (e.g., encoder 232) increases the compression level to adjust for changing network conditions. For example, FIG. 3D illustrates the four media frames depicted in FIG. 3C after lossless compression has occurred. Each of the frames has a total size less than available network bandwidth 305.

Figure 4:
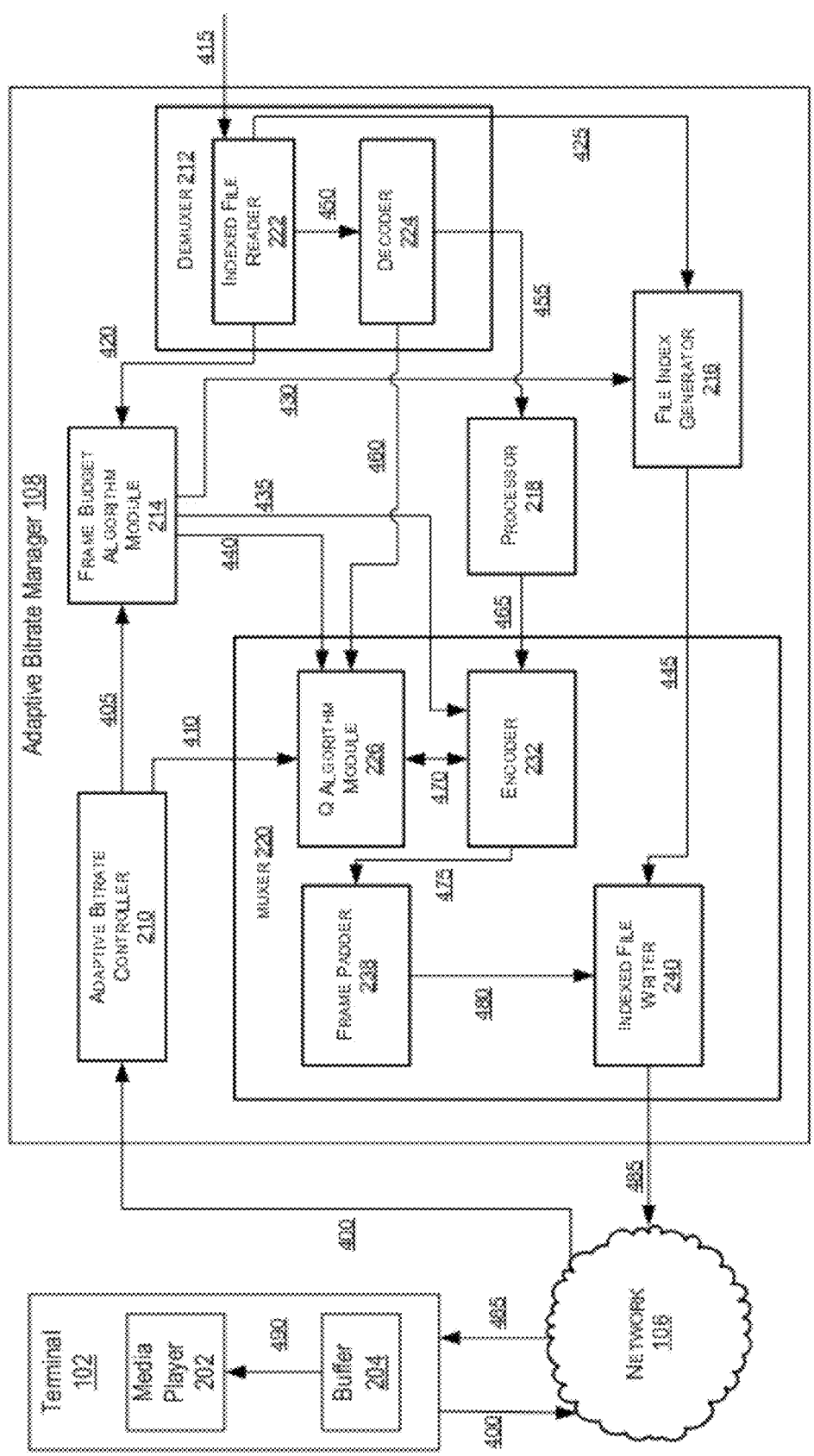
FIG. 4 is a functional diagram illustrating an exemplary communication flow in the exemplary system of FIG. 2.

FIG. 4 is a functional diagram illustrating an exemplary process flow utilizing dynamic budget encoding in the embodiment of FIG. 2. Without departing from the exemplary embodiments, the exemplary process flow can be altered to delete steps, change the order of steps, or include additional steps.

The adaptive bitrate controller 210 receives (400) one or more receiver reports from terminal 102. Adaptive bitrate controller 210 uses the receiver reports to calculate an optimal session bitrate and provides the optimal session bitrate (405, 410) to frame budget algorithm module 214 and quantization algorithm module 226. Additionally, adaptive bitrate controller 210 dynamically adjusts the optimal session bitrate in response to changes in the available network bandwidth and provides the adjusted optimal session bitrate to frame budget algorithm module 214 and quantization algorithm module 226. For example, if the available network bandwidth degrades, adaptive bitrate controller 210 automatically decreases the optimal session bitrate Likewise, if the available network bandwidth improves, adaptive bitrate controller 210 automatically increases the optimal session bitrate.

The media receiver report can be, for example, an RTCP receiver report or a TCP ACK in the case of pseudo-streaming. RTCP is a protocol for providing quality control information for an RTP flow. In some embodiments, media player 202 periodically transmits the RTCP receiver report. U.S. Pat. No. 7,991,904, filed on Mar. 31, 2009, U.S. Patent Application Publication No. 2011/0283012, filed on Jul. 29, 2011, U.S. Pat. No. 7,987,285, filed on Jul. 9, 2008, and U.S. Patent Application Publication No. 2011/0283015, filed on Jul. 25, 2011, and herein incorporated by reference, discuss in detail how the optimal session bitrate and available network bandwidth may be determined using one or more receiver reports.

After receiving (415) an original indexed media file from a data network (from one or more media servers), adaptive bitrate manager 108 can direct the original indexed media file to indexed file reader 222. Indexed file reader 222 may extract from the original indexed media file an original frame index referencing each original media frame, and parse the original file index to retrieve information about the original media frames, for example, the frame size, the offset, and the order of each original media frame. Indexed file reader 222 may pass (420, 425) the extracted original file index and the parsed information to frame budget algorithm module 214 and file index generator 216. In some embodiments, frame budget algorithm module 214 and file index generator 216 may parse the frame index, e.g., the original file index, to retrieve the information about the original media frames.

Based on the original file index and the optimal session bitrate, frame budget algorithm module 214 may estimate frame budgets, i.e., frame sizes, for processed/encoded frames. In some embodiments, frame budget algorithm module 214 considers padding when making its estimation. When estimating the frame budgets, frame budget algorithm module 214 may also consider some parameters determined by decoder 224 and/or encoder 232. In some embodiments, the frame budget for each output media frame is in excess of the original media frame size. For example, frame budget algorithm module 214 can be configured to provide a frame budget of 150% of the original media frame size. Frame budget algorithm module 214 may provide (430, 435, and 440) the estimated frame budgets to file index generator 216, encoder 232, and quantization algorithm module 226, respectively.

After receiving (425, 430) the original file index and the estimated frame budgets, file index generator 216 may generate an output frame index for an output indexed data. In some embodiments, file index generator 216 may also consider configuration of encoder 232 to update certain fields in the output file index. The output file index may contain byte size and byte offset for each output frame within output indexed data. Information in the output file index may correspond to information in the original file index. The order of each output frame within the output indexed data may remain the same as that in the original indexed media file. File index generator 216 may transfer (445) the output file index to indexed file writer 240 to write the output file index to the output indexed data to be streamed to terminal 102.

Besides extracting the original file index, indexed file reader 222 may also retrieve original media frames from the original file index of the original indexed media file for further processing. Indexed file reader 222 can retrieve the original media frames, one by one, based on the original frame index that references each original media frame. Indexed file reader 222 may pass (450) the retrieved original media frame to decoder 224.

Decoder 224 may decode the original media frame, extract original encoding parameters from the decoded frame, and annotate the encoding parameters onto the decoded frame for use by later components. Decoder 224 may pass (455) the decoded frame to processor 218 for further processing. In addition, decoder 224 may provide (460) the original encoding parameters to quantization algorithm module 226 to predict new encoding parameters for generating an encoded frame within a corresponding frame budget.

Processor 218 can perform additional generic processing to the media data. Processor 218 may transfer (465) the processed frame to encoder 232. For example, processor 218 may add a watermark, change the frame size, change the frame rate, or some combination thereof to the data being processed.

Encoder 232 may perform encoding on processed frame based on its communications (470) with quantization algorithm module 226. Quantization algorithm module 226 may set new encoding parameters, including new quantization parameters, for encoding the current processed frame. The setting new encoding parameters may be based on the optimal session bitrate provided by adaptive bitrate controller 210, a corresponding frame budget decided by frame budget algorithm module 214, and the original encoding parameters provided by decoder 224. The new encoding parameters can be used to generate an encoded frame fitting within the frame budget. Quantization algorithm module 226 can provide the new encoding parameters to encoder 232.

After receiving the new encoding parameters as inputs, encoder 232 can encode the current processed frame to generate an output frame fitting within the corresponding frame budget. If the generated frame does not fit within the corresponding frame budget, encoder 232 may invoke (470) quantization algorithm module 226 to adjust the encoding parameters, including new quantization parameters, then re-encode the frame. Encoder 232 can provide (475) the encoded frame to frame padder 238 for padding.

The encoded frame may be smaller than the allocated frame budget for that frame. Frame padder 238 may insert padding to make the encoded frame match the allocated frame budget. Frame padder 238 may provide (480) the padded frame to indexed file writer 240.

After receiving (445) the output file index, indexed file writer 240 may write the output file index to output indexed file data 228 and stream (485) output indexed file data 228 as a first step. In some embodiments, prior to streaming (485), indexed file writer 240 may perform lossless compression on the output file index. Additionally, indexed file writer 240 performs lossless compression on one or more padded media frames to create output media frames. Indexed file writer 240 then writes the output media frame to output indexed file data 228 and streams (485) the output indexed file data 228 to terminal 102, and specifically, buffer 204, via network 106.

Buffer 204 temporarily stores output indexed data 228 before providing (490) output indexed data 228 to media player 202 for playback. Media player 202 first retrieves the output file index from output indexed data 228. Media player 202 then de-compresses output indexed data 228 such that the padding associated with each output media frame is uncompressed and each frame matches the frame budget set in the output file index. Media player 202 then plays back the output media frames in the order specified by the output frame index.

Figure 5:
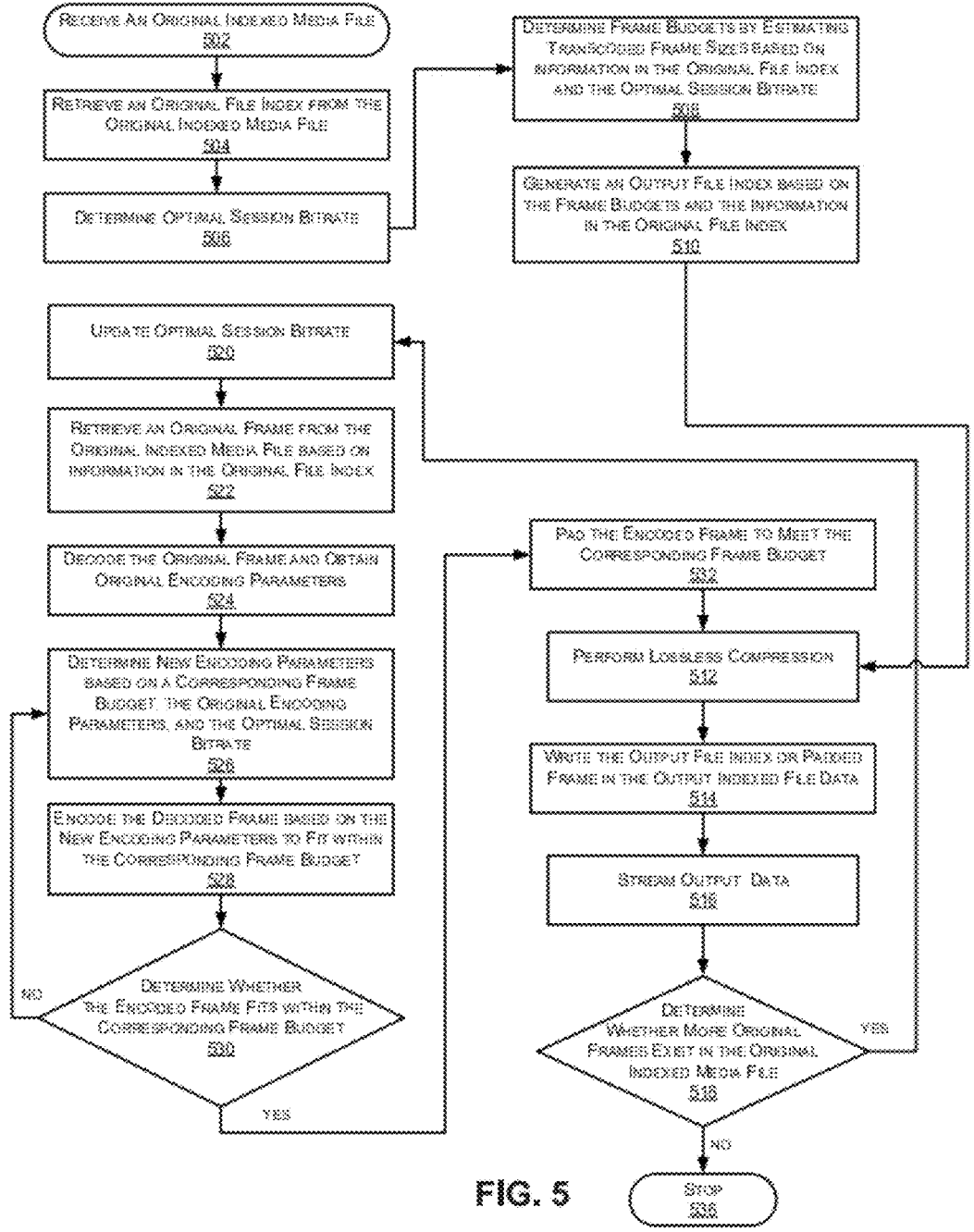
FIG. 5 is a flowchart representing an exemplary method an exemplary method of dynamic budget encoding.

FIG. 5 is a flowchart representing an exemplary method of dynamic budget encoding. Without departing from the exemplary embodiments, the exemplary process flow can be altered to delete steps, change the order of steps, or include additional steps.

After receiving (502) an original indexed media file, an adaptive bitrate manager (e.g., adaptive bitrate manager 108) retrieves (504) from the file an original frame index. The original frame index may reference each original media frame and specify information about original media frames in the original indexed media file, such as frame size and byte offset of each original media frame.

The adaptive bitrate manager determines an initial optimal session bitrate (506) using one or more receiver reports provided by a terminal. Techniques for determining optimal session bitrate are described in U.S. Pat. No. 7,991,904, filed on Mar. 31, 2009, U.S. Patent Application Publication No. 2011/0283012, filed on Jul. 29, 2011, U.S. Pat. No. 7,987,285, filed on Jul. 9, 2008, and U.S. Patent Application Publication No. 2011/0283015, filed on Jul. 25, 2011. Additionally, in some embodiments, network performance observed during previous requests for content may be used to assist in determining the optimal session bitrate.

Based on the frame index and the initial optimal session bitrate, the adaptive bitrate manager determines (508) frame budgets by estimating output frame sizes. Each output media frame has one corresponding frame budget. The adaptive bitrate manager generates (510) an output frame index, based on the frame budgets and the original frame index. The adaptive bitrate manager uses the frame budgets as frame sizes of output media frames in the output frame index, and computes byte offset for each output frame based on the frame sizes.

The adaptive bitrate manager then performs lossless compression on the output file index (512) and adaptive bitrate manager writes (514) the compressed output frame index as output indexed file data. The adaptive bitrate manager then streams (516) the output indexed file data to the terminal.

The adaptive bitrate manager determines (518) whether more original media frames exist in the original indexed media file. If yes, the flow goes to step 520, and adaptive bitrate manager updates the optimal session bitrate (520) using one or more receiver reports provided by the terminal.

The adaptive bitrate manager retrieves (522) an original media frame from the original indexed media file based on the original frame index. Also, the adaptive bitrate manager decodes (524) the original media frame and obtains (524) original encoding parameters of the decoded frame.

Based on a corresponding frame budget, the optimal session bitrate, and the original encoding parameters, the adaptive bitrate manager determines (526) new encoding parameters, including quantization parameters, for the decoded frame. Using the new encoding parameters, the adaptive bitrate manager encodes (528) the decoded frame. The adaptive bitrate manager determines (530) whether the encoded frame fits within the corresponding frame budget. If the encoded frame cannot fit within the corresponding frame budget, the adaptive bitrate manager may go back to step 526 to adjust (526) the new encoding parameters and re-encode (528) the frame using the adjusted encoding parameters until the encoded frame fits within the corresponding frame budget.

If the encoded frame fits within the corresponding frame budget, the adaptive bitrate manager can pad (532) the encoded frame to meet the corresponding frame budget if the encoded frame does not meet the frame budget. The padding adds extra no-operation bytes to the encoded frame.

The adaptive bitrate manager then performs lossless compression (512) on the padded media frame to create an output media frame, and writes (514) the output media frame as output indexed file data. The adaptive bitrate manager then streams (516) the output indexed file data to the terminal.

Further, the adaptive bitrate manager determines (518) whether more original media frames exist in the original indexed media file. If yes, the flow goes back to step 520. If not, the method then ends (536).

Figure 6:
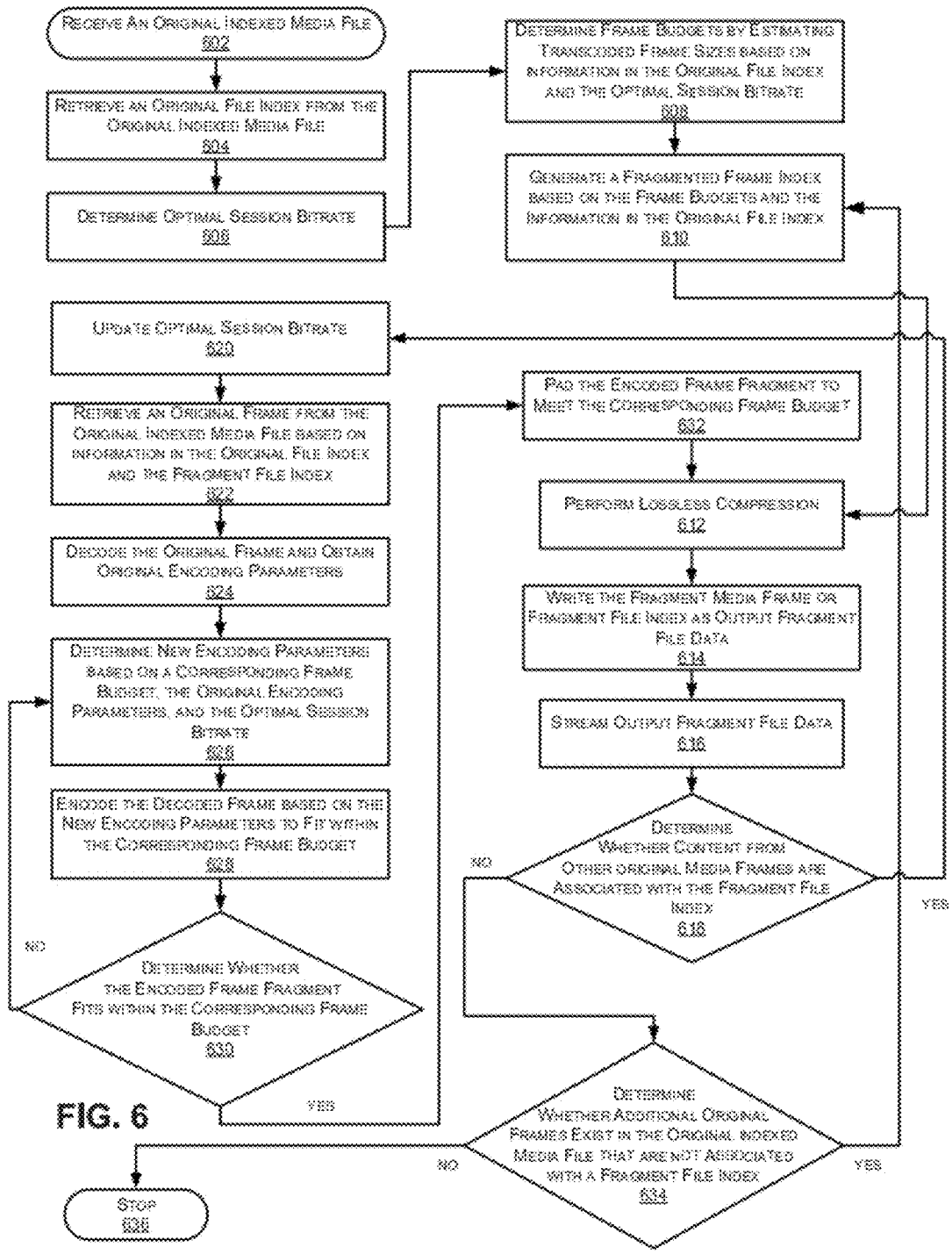
FIG. 6 is a flowchart representing an exemplary method exemplary method for transcoding an original indexed media file into a series of indexed file fragments.

FIG. 6 is a flowchart representing an exemplary method for transcoding an original indexed media file into a series of indexed file fragments. Without departing from the exemplary embodiments, the exemplary process flow can be altered to delete steps, change the order of steps, or include additional steps.

After receiving (602) an original indexed media file, an adaptive bitrate manager (e.g., adaptive bitrate manager 108) retrieves (602) from the file an original frame index. The frame index may reference each original media frame and specify information about original media frames in the original indexed media file, such as frame size and byte offset of each original media frame.

The adaptive bitrate manager determines an initial optimal session bitrate (606) using one or more receiver reports provided by a terminal. Techniques for determining optimal session bitrate are described in U.S. Pat. No. 7,991,904, filed on Mar. 31, 2009, U.S. Patent Application Publication No. 2011/0283012, filed on Jul. 29, 2011, U.S. Pat. No. 7,987,286, filed on Jul. 9, 2008, and U.S. Patent Application Publication No. 2011/0283016, filed on Jul. 26, 2011. Additionally, in some embodiments, network performance observed during previous requests for content may be used to assist in determining the optimal session bitrate.

Based on the frame index and the initial optimal session bitrate, the adaptive bitrate manager determines (608) frame budgets by estimating output frame sizes. Each output frame has one corresponding frame budget.

The adaptive bitrate manager generates (610) a fragmented frame index, based on the frame budgets and a portion of the original frame index. The adaptive bitrate manager uses the frame budgets as frame sizes for the fragment media frames associated with the fragment file index, and computes byte offset for each fragment media frame based on the frame sizes.

The adaptive bitrate manager then performs lossless compression on the fragment file index (612) and adaptive bitrate manager writes (614) the compressed fragment file index as output fragment file data. The adaptive bitrate manager then streams (616) the output fragment file data to the terminal.

The adaptive bitrate manager determines (618) whether content from other original media frames are associated with the fragment file index. If yes, the flow goes to step 620, and adaptive bitrate manager updates the optimal session bitrate (620) using one or more receiver reports provided by the terminal. Alternatively, in some embodiments not shown, instead of going to step 620, the flows goes to step 622.

If it is determined that content from other original media frames are not associated with the fragment file index, the adaptive bitrate manager determines (634) whether additional original media frames exist in the original indexed media file that are not associated with a fragment file index. If yes, the flow goes to step 610, and a second fragment frame index is generated. The second fragment frame index and its associated fragment media frames represent a second portion of the original indexed media file.

The adaptive bitrate manager retrieves (622) an original media frame from the original indexed media file based on the frame index of original media frames in the original indexed media file. Also, the adaptive bitrate manager decodes (624) the original media frame and obtains (624) original encoding parameters of the decoded frame.

Based on a corresponding frame budget, the optimal session bitrate, and the original encoding parameters, the adaptive bitrate manager determines (626) new encoding parameters, including quantization parameters, for the decoded frame. Using the new encoding parameters, the adaptive bitrate manager encodes (628) the decoded frame as an encoded frame fragment. In some embodiments, the adaptive bitrate manager encodes the decoded frame as a plurality of encoded frame fragments. The adaptive bitrate manager determines (630) whether the encoded frame fragment fits within the corresponding frame budget allocated for that fragment. If the encoded frame fragment cannot fit within the corresponding frame budget, the adaptive bitrate manager may go back to step 626 to adjust (626) the new encoding parameters and re-encode (628) the frame using the adjusted encoding parameters until the encoded frame fragment fits within the corresponding frame budget.

If the encoded frame fits within the corresponding frame budget, the adaptive bitrate manager can pad (632) the encoded frame fragment to meet the corresponding frame budget if the encoded frame fragment does not meet the frame budget. The padding adds extra no-operation bytes to the encoded frame.

The adaptive bitrate manager then performs lossless compression (612) on the padded frame fragment to create a fragment media frame, and writes (614) the fragment media frame as output fragment file data. The adaptive bitrate manager then streams (616) the output fragment file data to the terminal.

The adaptive bitrate manager determines (618) whether content from other original media frames are not associated with the fragment file index being processed. If yes, the flow goes to step 620, and the process continues until the no additional original media frames are associated with the fragment file index being processed. Further, the adaptive bitrate manager determines (634) whether whether additional original media frames exist in the original indexed media file that are not associated with any fragment file index. If yes, the flow goes back to step 610, and a new fragment frame index is generated. If not, the method then ends (636).

Figure 7:
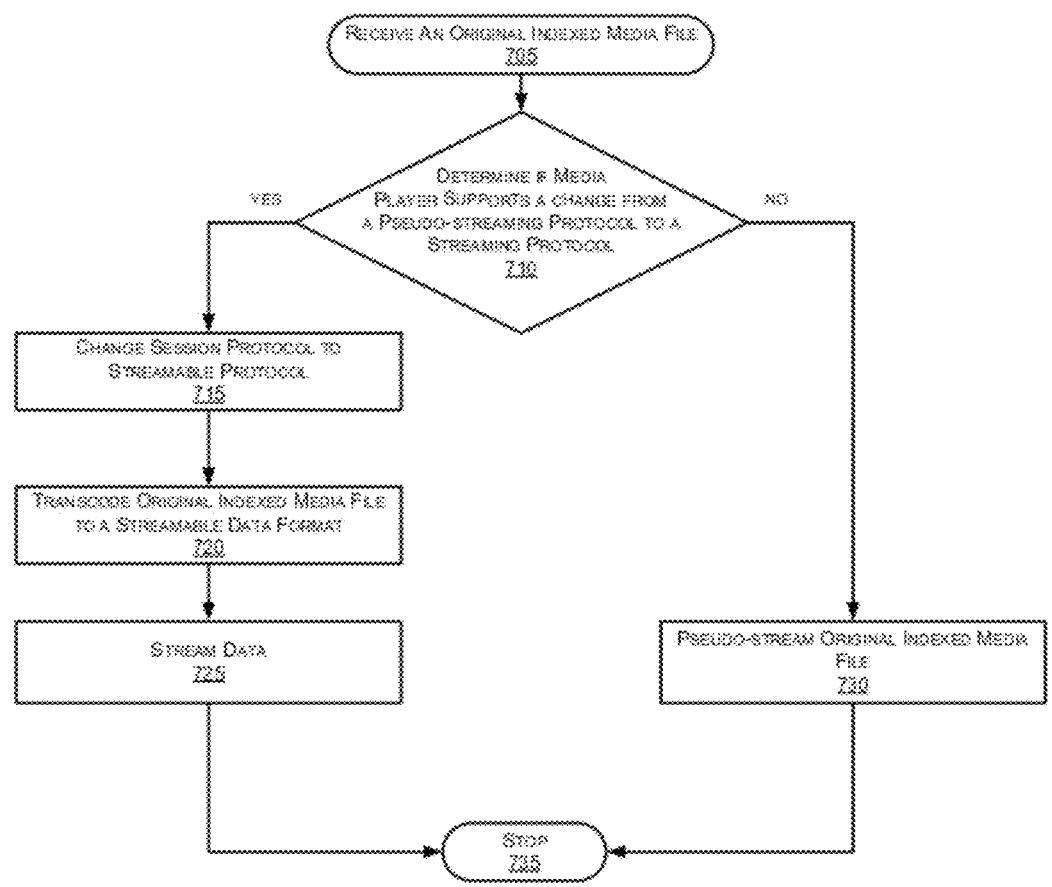
FIG. 7 is a flowchart representing an exemplary method for transcoding an original indexed media file into a format suitable for streaming.

FIG. 7 is a flowchart representing an exemplary method for transcoding an original indexed media file into a format suitable for streaming. Without departing from the exemplary embodiments, the exemplary process flow can be altered to delete steps, change the order of steps, or include additional steps.

After receiving (705) an original indexed media file, an adaptive bitrate manager (e.g., adaptive bitrate manager 108) determines if a media player (e.g., media player 202) supports a change from a pseudo-streaming protocol to a streaming protocol, such as the Real Time Streaming Protocol (RTSP). For example, the adaptive bitrate manager may use an identifier (e.g., HTTP or RTSP user agent string) provided by the media player to look up player attributes in an internal table to determine whether the media player supports a change to the streaming protocol. Streaming protocols are specifically designed to transport multimedia information with explicit timing information, and packets are generally expected to be sent at the time the media frame(s) in the payload are due. If yes, the adaptive bitrate manager automatically changes (715) the session protocol to a streamable protocol, e.g., RTSP. The adaptive bitrate manager then transcodes (720) and streams (725) the original indexed media file using the streaming protocol. If the media player does not support a change from a pseudo-streaming protocol to a streaming protocol, the adaptive bitrate manager pseudo-streams (730) the original indexed file using the techniques described above with reference to FIGS. 5 and 6. The process then ends 735.

Figure 8:
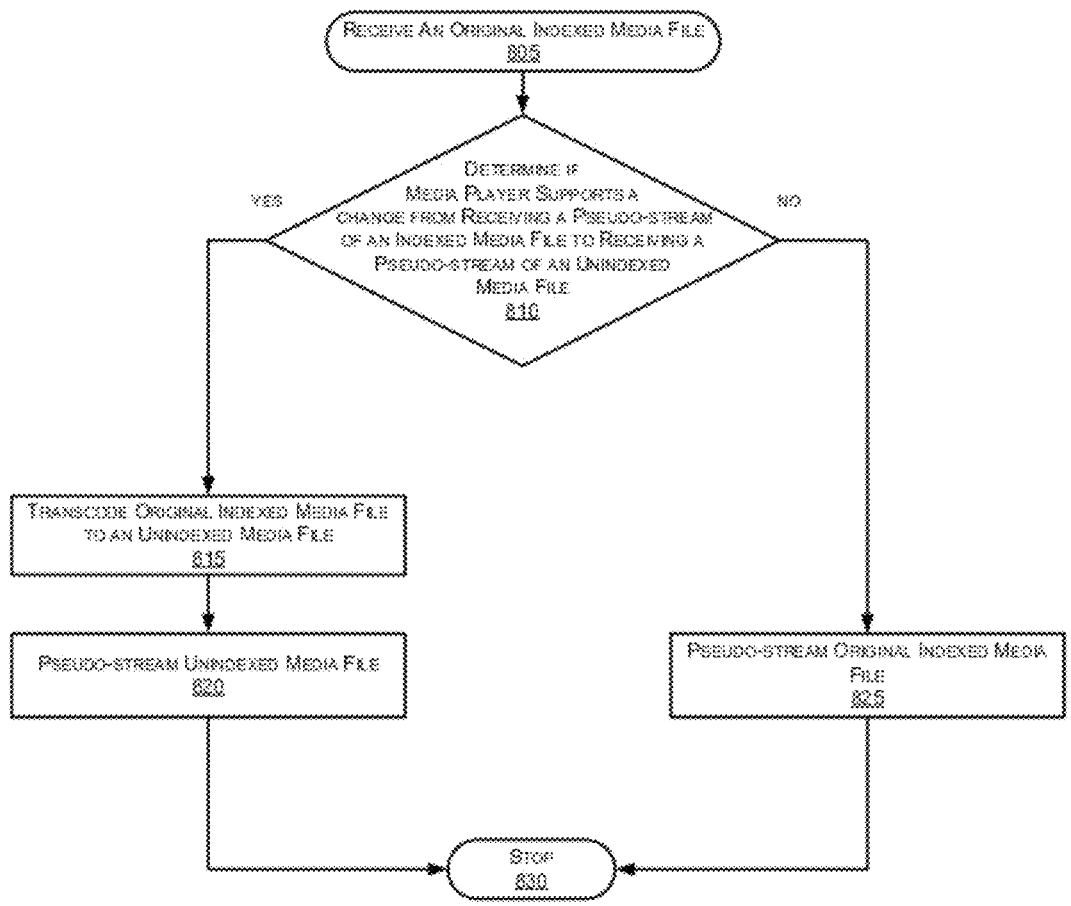
FIG. 8 is a flowchart representing an exemplary method for transcoding an original indexed media file into an unindexed media file that is suitable for pseudo-streaming.

FIG. 8 is a flowchart representing an exemplary method for transcoding an original indexed media file into an unindexed media file that is suitable for pseudo-streaming. Without departing from the exemplary embodiments, the exemplary process flow can be altered to delete steps, change the order of steps, or include additional steps.

After receiving (805) an original indexed media file, an adaptive bitrate manager (e.g., adaptive bitrate manager 108) determines (810) if a media player (e.g., media player 202) supports a change from receiving a pseudo-stream of an indexed media file (e.g., .MP4) to receiving a pseudo-stream of an unindexed media file (e.g., flash video). If yes, the adaptive bitrate manager automatically transcodes (815) the original indexed media file into an unindexed media file and pseudo-streams (820) the unindexed media file. If the media player does not support a change from receiving a pseudo-stream of an indexed media file to receiving a pseudo stream of an unindexed media file, the adaptive bitrate manager pseudo-streams (825) the original indexed file using the techniques described above with reference to FIGS. 5 and 6. The process then ends (830).

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the preceding specification, the disclosure has been described with reference to specific exemplary embodiments. It will however, be evident that various modifications and changes may be made without departing from the broader spirit and scope of the disclosure as set forth in the claims that follow. The specification and drawings are accordingly to be regarded as illustrative rather than restrictive. Other embodiments of the disclosure may be apparent to those skilled in the art from consideration of the specification and practice disclosed herein.

What is claimed is:

1. A method performed by one or more processors of an adaptive bitrate manager, the method comprising:
   receiving streaming media data having an original media frame, an original frame index referencing the original media frame, and an original file index;
   determining an optimal session bitrate, wherein the optimal session bitrate is based on the available network bandwidth between a server and a terminal;
   allocating a frame budget for an output media frame by estimating a frame size of the output media frame based on the original frame index and the optimal session bitrate, wherein the frame budget represents estimated size of the output media frame;
   generating the output media frame by processing the original media frame based on first encoding parameters and, if the allocated frame budget is greater than a frame size of the processed media frame, padding the processed media frame;
   generating an output file index based on the frame budget and the original file index; and
   providing the output media frame associated with the output file index.

2. The method of claim 1, further comprising:
   allocating frame budgets for output media frames by estimating frame sizes of the output media frames based on the original frame index and the optimal session bitrate, each output media frame having a corresponding frame budget; and
   generating, before the output media frames are generated, an output frame index referencing the output media frames based on the frame budgets and the original frame index.

3. The method of claim 2, further comprising:
   determining an updated optimal session bitrate;
   determining new encoding parameters using the updated optimal session bitrate; and
   generating a second output media frame associated with the output file index, wherein the output media frame is generated using the original media frame and the new encoding parameters.

4. The method of claim 1, further comprising:
   retrieving the original media frame from the streaming media data based on the original frame index;
   decoding the original media frame; and
   obtaining the first processing parameters based on the decoded original media frame.

5. The method of claim 1, further comprising:
   if the output media frame does not fit within the frame budget, determining second encoding parameters based on the frame budget and on the first encoding parameters; and
   generating the output media frame by re-processing the media frame based on the second encoding parameters and, if the allocated frame budget is greater than a frame size of the processed media frame, padding the processed media frame.

6. The method of claim 1, further comprising:
   removing the padding by compressing the output media frame before sending the output media frame to the terminal.

7. A server configured to receive streaming media data having an original media frame, an original frame index referencing the original media frame, and an original file index, the server comprising:
   an adaptive bitrate controller module configured to determine an optimal session bitrate, wherein the optimal session bitrate is based on the available network bandwidth between a server and a terminal;
   a frame budget algorithm module configured to allocate a frame budget for an output media frame by estimating a frame size of the output media frame based on the original frame index and the optimal session bitrate, wherein the frame budget represents estimated size of the output media frame;
   a quantization algorithm module configured to determine first encoder parameters based on the frame budget, the optimal session bitrate, and the original media frame;
   an encoder configured to encode the media frame based on the first processing parameters;
   a frame padder configured to pad the processed media frame to generate the output media frame;
   a file index generator configured to generate an output file index based on the frame budget and the original file index; and
   a frame writer configured to provide the output media frame associated with the output file index.

8. The server of claim 7, further comprising a file reader configured to receive the streaming media data and extract the original frame index.

9. The server of claim 7, wherein the frame budget algorithm module is further configured to:
   allocate frame budgets for output media frames by estimating frame sizes of the output media frames based on the original frame index and the optimal session bitrate, each output media frame having a corresponding frame budget.

10. The server of claim 9,
   wherein the file index generator is further configured to generate, before the output media frames are generated, an output frame index referencing the output media frames based on the frame budgets and the original frame index.

11. The server of claim 10, the file index generator is further configured to update the output frame index based on configuration information of the encoder.

12. The server of claim 7, further comprising:
   a decoder configured to decode the original media frame, and obtain information from the decoded media frame to facilitate the processing algorithm module to determine the first processing parameters.

13. The server of claim 7, the processing algorithm module is further configured to:
   if the output media frame does not fit within the frame budget, determine second encoding parameters based on the frame budget and on the first encoding parameters.

14. The server of claim 13, the processing module is further configured to:
   re-process the output media frame based on the second processing parameters such that the processed media frame fits within the frame budget.

15. A non-transitory computer readable medium that stores a set of instructions that is executable by at least one processor of a server to cause the server to perform a method, the method comprising:
   receiving streaming media data having an original media frame, an original frame index referencing the original media frame, and an original file index;

determining an optimal session bitrate, wherein the optimal session bitrate is based on the available network bandwidth between a server and a terminal;

allocating a frame budget for an output media frame by estimating a frame size of the output media frame based on the original frame index and the optimal session bitrate, wherein the frame budget represents estimated size of the output media frame;

generating the output media frame by processing the original media frame based on first encoding parameters and, if the allocated frame budget is greater than a frame size of the processed media frame, padding the processed media frame;

generating an output file index based on the frame budget and the original file index; and providing the output media frame associated with the output file index.

16. The non-transitory computer readable medium of claim 15, wherein the set of instructions that is executable by the at least one processor of the server to cause the server to further perform:

allocating frame budgets for output media frames by estimating frame sizes of the output media frames based on the original frame index and the optimal session bitrate, each output media frame having a corresponding frame budget; and generating, before the output media frames are generated, an output frame index referencing the output media frames based on the frame budgets and the original frame index.

17. The non-transitory computer readable medium of claim 16, wherein the set of instructions that is executable by the at least one processor of the server to cause the server to further perform:

determining an updated optimal session bitrate;

determining new encoding parameters using the updated optimal session bitrate; and generating a second output media frame associated with the output file index, wherein the output media frame is generated using the original media frame and the new encoding parameters.

18. The non-transitory computer readable medium of claim 15, wherein the set of instructions that is executable by the at least one processor of the server to cause the server to further perform:

retrieving the original media frame from the streaming media data based on the original frame index;

decoding the original media frame; and obtaining the first processing parameters based on the decoded original media frame.

19. The non-transitory computer readable medium of claim 15, wherein the set of instructions that is executable by the at least one processor of the server to cause the server to further perform:

if the output media frame does not fit within the frame budget, determining second encoding parameters based on the frame budget and the first encoding parameters; and generating the output media frame by re-processing the media frame based on the second encoding parameters and, if the allocated frame budget is greater than a frame size of the processed media frame, padding the processed media frame.

20. The non-transitory computer readable medium of claim 15, wherein the set of instructions that is executable by the at least one processor of the server to cause the server to further perform:

removing the padding by compressing the output media frame before sending the output media frame to the terminal.

* * * * *